No. 751,133. Patented February 2, 1904.

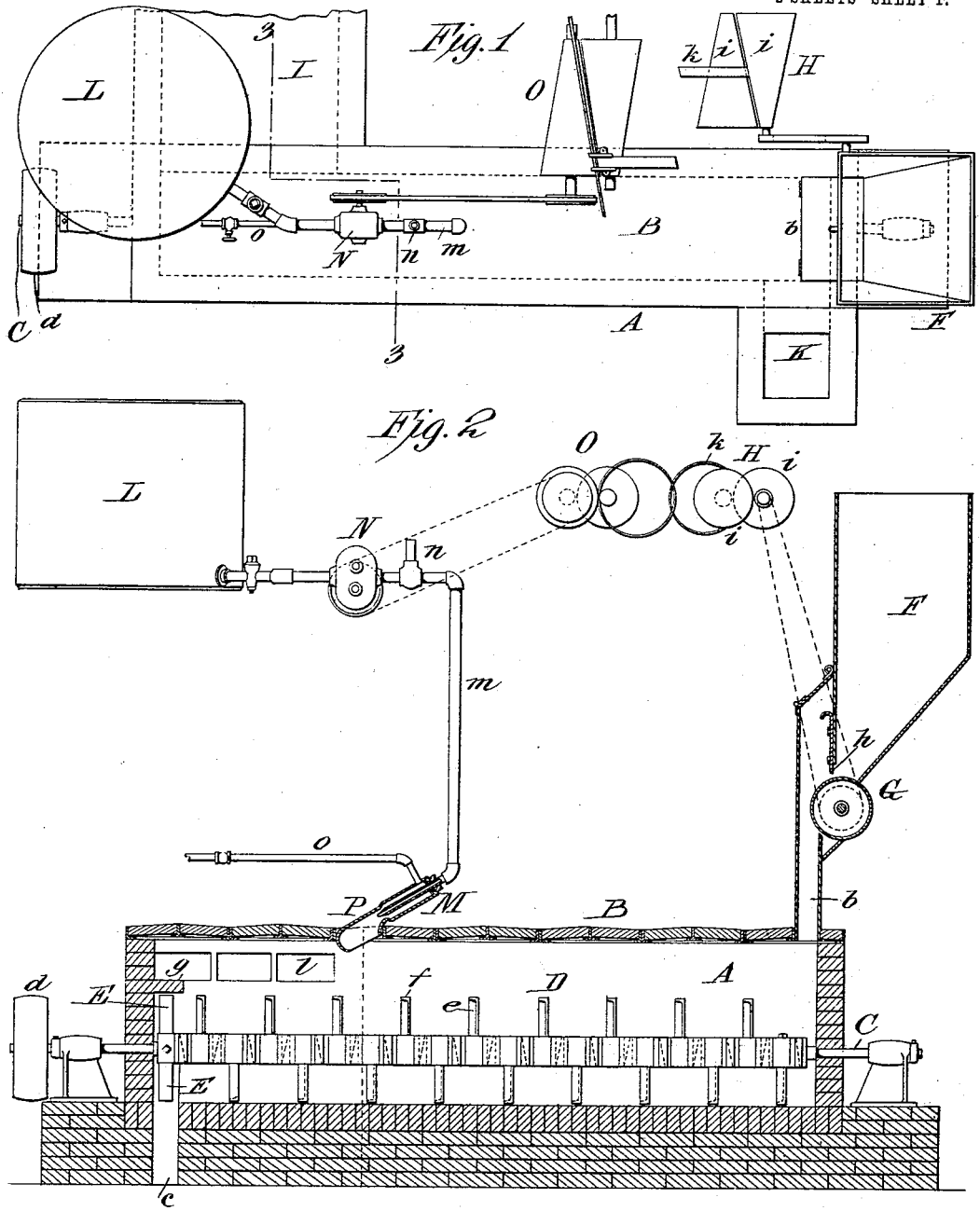

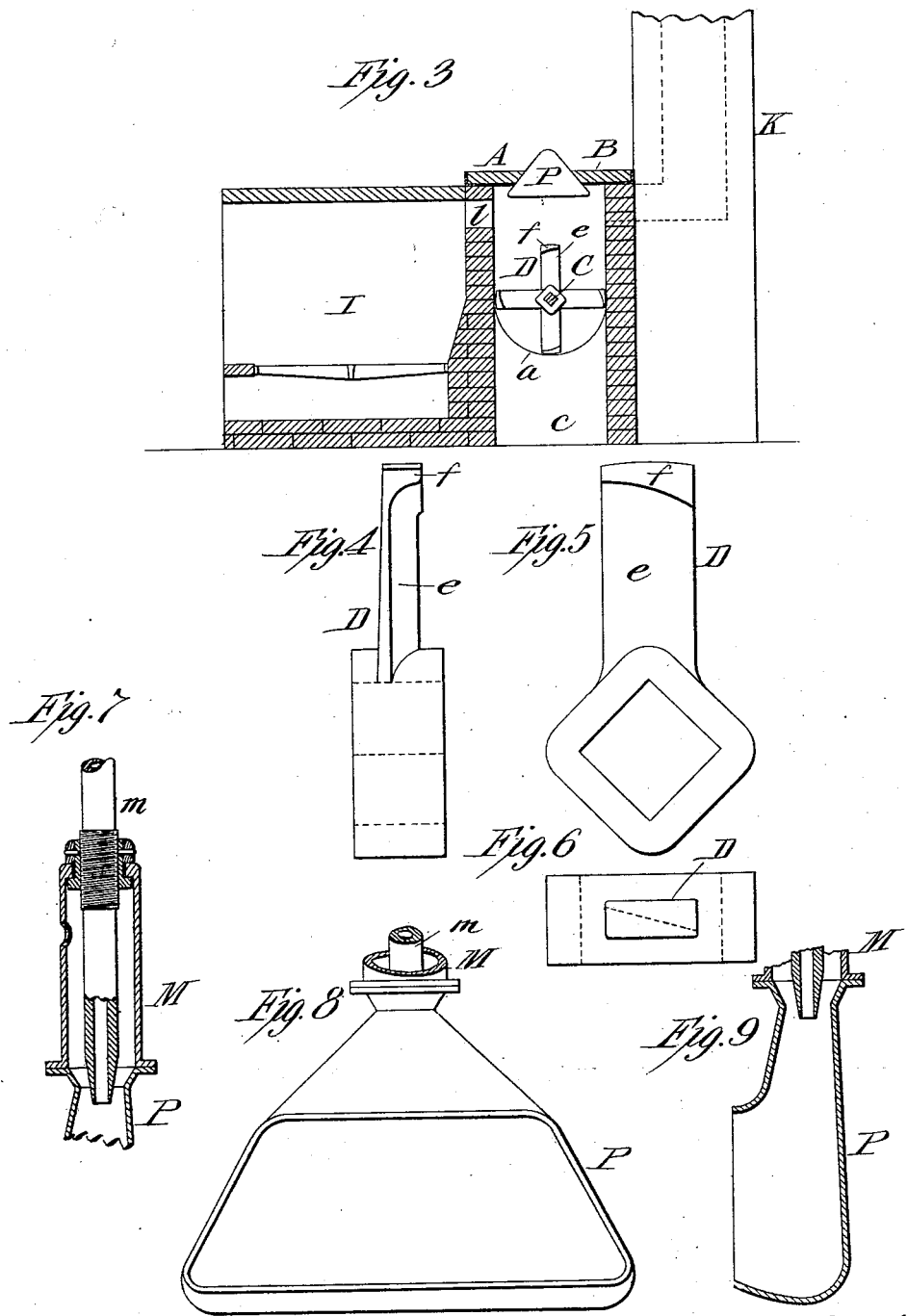

UNITED STATES PATENT OFFICE.

ELLSWORTH B. A. ZWOYER AND ROLLAND A. ZWOYER, OF HOBOKEN, NEW JERSEY, ASSIGNORS TO THE ZWOYER FUEL COMPANY, OF NEW YORK, N. Y., A CORPORATION OF NEW JERSEY.

APPARATUS FOR PREPARING PULVERULENT MATERIALS FOR MOLDING OR BRIQUETING.

SPECIFICATION forming part of Letters Patent No. 751,133, dated February 2, 1904.

Application filed May 12, 1903. Serial No. 156,748. (No model.)

*To all whom it may concern:*

Be it known that we, ELLSWORTH B. A. ZWOYER and ROLLAND A. ZWOYER, citizens of the United States, residing at Hoboken, in the county of Hudson and State of New Jersey, have invented a certain new and useful Improvement in Apparatus for Preparing Pulverulent Materials for Molding or Briqueting, of which the following is a description.

The object we have in view is to produce a simple and effective apparatus for preparing pulverulent material for molding or briqueting, and particularly for mixing a binder therewith and for suitably heating or roasting the material.

The apparatus is designed to carry out the process invented by us, which process is made the subject of a separate application for patent, Serial No. 156,749, filed May 12, 1903.

In the accompanying drawings, Figure 1 is a top view of the apparatus. Fig. 2 is a side elevation and partial section of the same. Fig. 3 is a transverse vertical section on line 3 3 in Fig. 1. Figs. 4, 5, and 6 are views illustrating the construction of the blades or paddles for agitating and feeding the pulverulent material, and Figs. 7, 8, and 9 are views illustrating the atomizer and distributing hood or spoon for delivering the binder to the apparatus.

The apparatus consists of a horizontally-arranged chamber A, lined with fire-brick and having a curved trough-like bottom $a$. The pulverulent material is delivered to the receiving end of the chamber through a pipe $b$ in the top of the chamber and is discharged from the other end through an opening $c$ in the bottom of the chamber. The top wall or cover B of the chamber is made up of a number of angle-iron frames supporting fire-bricks, so that the cover can be readily removed in whole or in part. Running logitudinally through the chamber A in its lower part is a shaft C, mounted in bearings outside of the chamber and driven by any suitable means, as by a belt passing over a pulley $d$, at a high speed of from two hundred to three hundred revolutions per minute for an extreme diameter of the blades carried by it of from sixteen to eighteen inches. The shaft C carries within the chamber a number of radial blades or paddles D, such blades or paddles being made of cast-iron or other suitable material and projecting from hubs having square openings which fit over the shaft, the shaft being made square to receive them. These blades D are transverse to the shaft C, but have their front faces $e$ beveled at a slight angle, so as to produce a forward but not rapid feed of the pulverulent material through the chamber A toward the discharge end. The ends of the blades D are cast with lips $f$, projecting from their front faces, which lips serve to scoop up the pulverulent material from the curved bottom of the chamber and throw it against the top of the chamber in a separated form, the pulverulent material falling back upon the blades. In this way the upper part of the chamber A will be kept filled with the pulverulent material in a suspended form with its particles separated. At the discharge end of the shaft C are paddles or blades E, whose broad faces are in a plane parallel with the shaft. These blades E work over the discharge-opening $c$ and under a ledge or shelf $g$, projecting from the end wall of the chamber, and serve to discharge the material through the opening $c$. The pulverulent material is carried by a hopper F, connecting with the pipe $b$ by means of suitable feeding devices, such as a roller-feed G. The quantity of material delivered by the roller-feed is regulated to some extent by an adjustable gate $h$ and also by varying the speed of the roller. For the purpose of varying the speed of the roller such roller is driven by any suitable variable-speed mechanism H. For this purpose we have illustrated a well-known form of device consisting of two cone-pulleys $i$ and a belt $k$, which travels between them and is adjusted to different points of the gap between the cone-pulleys by means of a shipper. The shaft of the roller G is connected to one of these cone-pulleys by means of a belt. Adjacent to the discharge end of the mixer is a furnace I, the combustion-chamber of which connects by a flue $l$ with the top of the chamber A at its discharge end. Connected with the top of the chamber A at the receiving end of the mixer is an uptake K, leading to a chimney or stack. The hot gases produced by the combustion of fuel in the furnace I pass into the chamber A at its discharging end and travel therethrough in a direction opposite to the direction of travel of the pulverulent material, such gases being discharged at the other end of the chamber A into the uptake K. The binder, which is preferably in the form of a liquid, is contained in a tank L, which is connected by a pipe $m$ with the atomizer M. The binder is fed in a regulated quantity through the pipe $m$ by means of a rotary pump N, which is driven by a variable-speed mechanism O of the kind described for driving the roller-feed for the pulverulent material or of any other suitable kind. A spring or weight-loaded valve $n$ is located in the pipe $m$ to prevent the flow of the binder through the pipe $m$ when the pump N is not in operation. A pipe $o$, provided with a suitable valve, delivers steam or compressed air to the atomizer M, atomizing the binder. The atomizer here shown terminates in a hood or spoon P, which projects through the top wall or cover of the chamber A. Other forms or styles of atomizers can be used; but the form shown has given good results. The hood or spoon P receives the stream delivered by the atomizer and spreads or scatters the same in a forward direction in the chamber A, so that the binder in a finely-divided form will pass as a cloud with the hot gases through the suspended or separated particles of pulverulent material toward the uptake K. The quantity of binder delivered will, however, be so regulated that it will be wholly or substantially used up in the coating of the particles of pulverulent material before the gases reach the uptake.

This apparatus forms an exceedingly efficient means for carrying on the process described in our application already referred to.

What we claim is—

1. In apparatus for preparing pulverulent material for molding or briqueting, the combination of means for maintaining the pulverulent material with its particles in a suspended or separated condition, and means for passing a binder in a finely-divided form through such suspended pulverulent material, substantially as set forth.

2. In apparatus for preparing pulverulent material for molding or briqueting, the combination of means for maintaining the pulverulent material with its particles in a suspended or separated condition, means for heating the pulverulent material, and means for passing a binder in a finely-divided form therethrough, substantially as set forth.

3. In apparatus for preparing pulverulent material for molding or briqueting, the combination of means for maintaining the pulverulent material with its particles in a suspended or separated condition, means for passing a binder in finely-divided form therethrough, and means for passing hot gases therethrough, substantially as set forth.

4. In apparatus for preparing pulverulent material for molding or briqueting, the combination of means for maintaining the pulverulent material with its particles in a suspended or separated condition, and an atomizer for delivering the binder in a finely-divided condition to the suspended or separated particles of pulverulent material, substantially as set forth.

5. In apparatus for preparing pulverulent material for molding or briqueting, the combination of a mixing-chamber, means for maintaining the pulverulent material therein with its particles in a suspended or separated condition, an atomizer for delivering the binder in a finely-divided condition to such chamber, and a furnace connected with such chamber for passing hot gases therethrough, substantially as set forth.

6. In apparatus for preparing pulverulent material for molding or briqueting, the combination with a horizontally-arranged mixing-chamber, of a high-speed shaft carrying within said chamber blades which feed the pulverulent material therethrough while maintaining it with its particles in a suspended or separated condition, and means for passing the binder in a finely-divided form through said chamber, substantially as set forth.

7. In apparatus for preparing pulverulent material for molding or briqueting, the combination with a horizontally-arranged mixing-chamber, of a high-speed shaft carrying within said chamber blades which feed the pulverulent material therethrough while maintaining it with its particles in a suspended or separated condition, means for passing the binder in a finely-divided form through said chamber, and means for also passing hot gases through said chamber, substantially as set forth.

8. In apparatus for preparing pulverulent material for molding or briqueting, the combination with the chamber and means for feeding the pulverulent material through said chamber and for maintaining its particles in a suspended or separated condition therein, of an atomizer for delivering the binder in finely-divided form to said chamber, and a pump driven by a variable-speed mechanism for feeding the binder to the atomizer, substantially as set forth.

9. In apparatus for preparing pulverulent material for molding or briqueting, the combination of the horizontal mixing-chamber, the high-speed conveyer and agitator therein, adjustable means for feeding the pulverulent material to one end of said chamber, an atomizer delivering the binder in finely-divided form to said chamber, adjustable means for feeding the binder to the atomizer, and a furnace and uptake for passing hot gases through said chamber, substantially as set forth.

This specification signed and witnessed this 9th day of May, 1903.

ELLSWORTH B. A. ZWOYER.
ROLLAND A. ZWOYER.

Witnesses:
JNO. ROBT. TAYLOR,
JOHN LOUIS LOTSCH.